J. P. RATIGAN.
FILING CABINET.
APPLICATION FILED JULY 10, 1914.
1,274,446.
Patented Aug. 6, 1918.
2 SHEETS—SHEET 1.
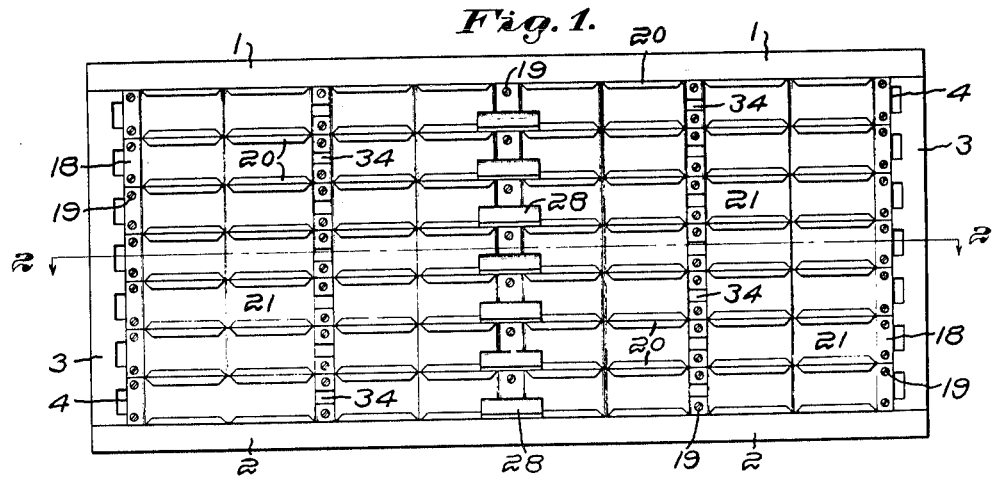
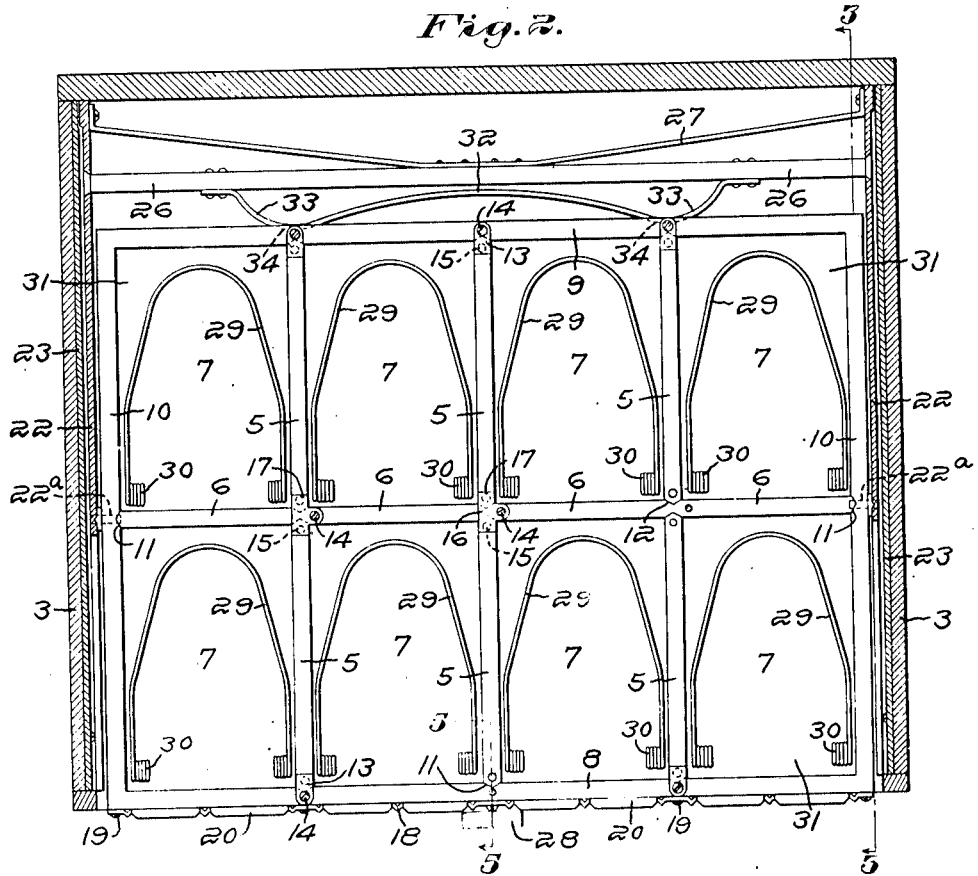
Witnesses:
Carl L. Choate.
Horace A. Croseman.
Inventor:
John P. Ratigan,
by Emery Booth Janney Varney
Attys.

J. P. RATIGAN.
FILING CABINET.
APPLICATION FILED JULY 10, 1914.
1,274,446.
Patented Aug. 6, 1918.
2 SHEETS—SHEET 2.
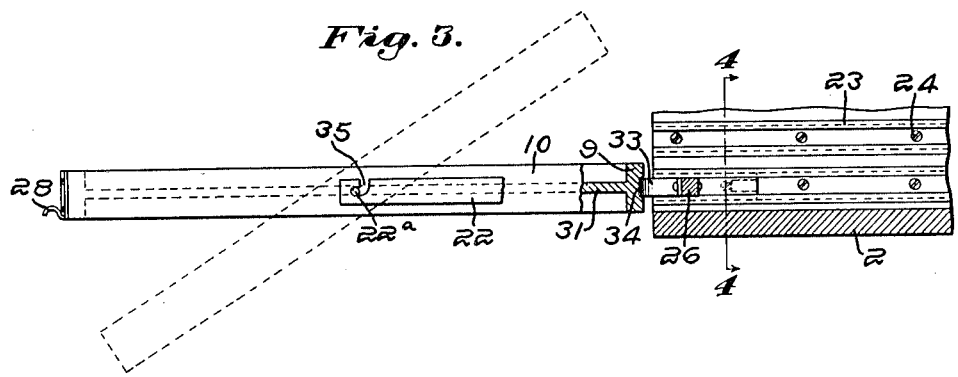
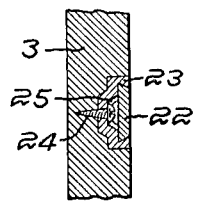
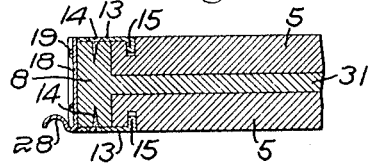
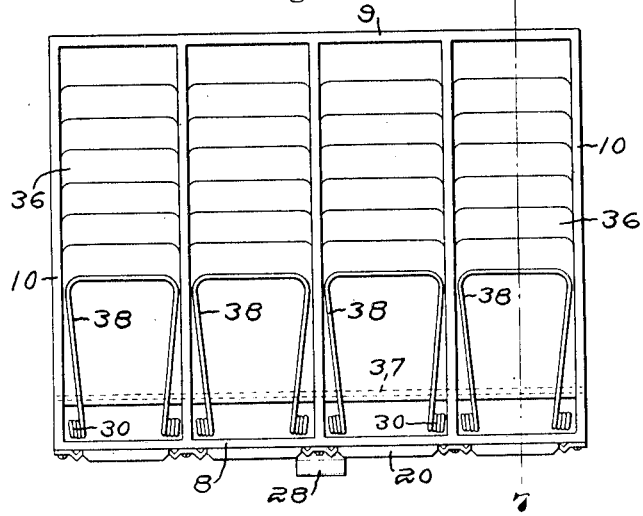
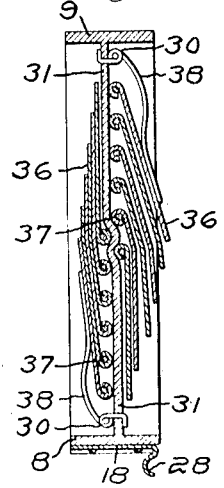
Witnesses:
Carl L. Choate.
Horace A. Crossman
Inventor:
John P. Ratigan,

UNITED STATES PATENT OFFICE.

JOHN P. RATIGAN, OF CLAREMONT, NEW HAMPSHIRE.

FILING-CABINET.

1,274,446.  Specification of Letters Patent.  Patented Aug. 6, 1918.

Application filed July 10, 1914. Serial No. 850,245.

*To all whom it may concern:*

Be it known that I, JOHN P. RATIGAN, a citizen of the United States, and a resident of Claremont, county of Sullivan, and State of New Hampshire, have invented an Improvement in Filing-Cabinets, of which the following description, in connection with the accompanying drawings, is a specification, like characters on the drawings representing like parts.

This invention relates to cabinets for filing or storing papers or any material in sheet form, where it is desired to preserve together one or more sheets for convenient reference, and aims particularly to provide an improved form of cabinet for filing loose sheets containing charges or other data which may comprise, for instance, a running or current account.

For a better understanding of my invention, I have illustrated one satisfactory embodiment thereof in the accompanying drawings, wherein—

Figure 1 is a front view of the cabinet;

Fig. 2 is a horizontal section thereof on the line 2—2, Fig. 1, looking down;

Fig. 3, a view on the line 3—3, Fig. 2, showing one of the drawers or slides withdrawn from the cabinet, parts being broken away;

Fig. 4, a detail sectional view of one of the drawer slides on the line 4—4, Fig. 3, partly in section, showing also the slide stop device;

Fig. 5, a vertical sectional detail on the line 5—5 Fig. 2, of the front end of one of the drawers;

Fig. 6, a plan view of a modified form of drawer;

Fig. 7, a vertical section of the same on the line 7—7, Fig. 6;

Fig. 8, a side view of one of the strip-locking members; and

Fig. 9, an edge view of the card receiving member showing, on an enlarged scale, the manner of fashioning it.

Referring to the drawing, and particularly to Fig. 1, my improved cabinet is shown as comprising the usual top 1, base 2, and opposed sides 3—3, which may be of suitable material as wood, and of course the cabinet may be of any convenient dimension, either as to width, height or depth.

The cabinet is shown, Figs. 1, 2, as provided with a plurality of drawers 4, of suitable size, and desired material as wood or metal. One or more drawers may be conveniently divided by means of suitable strips 5, 6, into a plurality of convenient sections or divisions 7, each of which may receive the papers constituting a separate account or record, or other classification.

For convenience I have shown, Fig. 2, these strips 5, 6, as removable so that the drawer may be used as one compartment or section, or it may be divided into several sections. In order that these strips may be readily removed and inserted, I have provided novel fastening members for locking the strips in position.

The front 8, Fig. 2, of the drawer, back 9 and sides 10, 10, are preferably recessed sufficiently at suitable points to receive the beveled outer ends 11, of the strips 5, 6. The strip 6, extending through the width of the drawer, is also preferably recessed at proper points to receive the beveled inner ends 12, of the strips 5—5.

For locking these strips together, any suitable means may be employed. I have illustrated, Figs. 2, 8, a satisfactory and novel form of device, however. For locking the outer or front and rear ends of the strips 5 I have provided a flat preferably metallic plate 13, one end of which is drilled to receive a screw 14 to secure the plate to one of the members 8 or 9. The opposite end of the plate 13, see Figs. 2 and 5, has formed on or secured to its lower face a pin 15 which may be received by a slot, Fig. 5, for that purpose, in the strip 5.

The opposite or inner ends of the strip 5, may be secured by similar locking members, Figs. 2, 8, in the form of T-shaped plates 16, the two arms 17, 17, of the plate each being provided at its lower face with the pin 15, Fig. 8, to be received by suitable slots in the members 5, 5, while the remaining arm is drilled to receive the screw 14 to lock the plate to the strip 6. By means of the foregoing novel fastening means the drawer may be readily converted from one of a single section to one having a plurality of smaller sections, or vice versa, at any time.

The front of each drawer may be provided, Figs. 1, 2, 9, with a strip or plate 18, as of metal, secured thereto by any convenient means, as screws 19. This strip may have its upper and lower edges inturned to provide flanges 20, while the plate may be folded or raised Figs. 1, 9, at suitable points to provide a plurality of name or identifying-card receiving pockets 21. Preferably two of these name card pockets are provided opposite each section, one pocket to receive the card for the section on each side of the drawer, as will be described presently.

For supporting the drawers in the cabinet, I have provided novel and convenient means. At each side of each drawer and at convenient points thereon, as for instance, substantially mid-way between the top and bottom and the front and the back thereof, I have attached to the drawer the forward end of a slide 22, as by pivots 22$^a$, which slide may be of suitable material as metal. The slide 22 may have a dove-tail sliding engagement with a guide 23 in the inner wall of the side cabinet member 3. The guide 23 is secured, see Fig. 4, as by screws or nails 24 to the inner wall of the cabinet. The guide 23, may be provided with a longitudinal groove 25 to receive the head of the pivot 22$^a$, if it protrudes beyond the face of the slide 22, and also to receive the screws 24 so that the slide 22 may fit closely and run evenly and smoothly therein. For preventing the slide from being withdrawn entirely from the cabinet, I have provided a novel stop device in the form of a section of the slide 22 which may be struck up from said slide at the proper point so that it will contact with a stop member, as one of the screws 24, with a round head. This section will, of course, spring past the screw head when it is inserted without difficulty, but will prevent withdrawal, as described.

For obtaining uniformity of motion of the slides and holding them in rigid relation to the drawer, the slides are preferably connected near their inner ends by a suitable cross-member 26 and this member may, in turn, be reinforced by a brace 27. The drawer is preferably provided with a convenient pull 28 on its front face. The foregoing construction permits the drawer to be readily withdrawn from the cabinet to its full extent, Fig. 3, for use and then returned to the cabinet again.

Each section or division 7 of the drawer may be conveniently provided with a clip or paper-holding device in any desired form, as for instance, a wire member 29 having its ends coiled about to form a spring 30 and then thrust through the bottom 31 of the drawer to lock it in position.

A large number of sheets of paper or other material may be safely retained beneath each one of these clips 29 and readily withdrawn when desired.

In order to increase the capacity of each drawer, I have positioned the bottom 31 substantially mid-way between the top and bottom edge of the front, back and side members, Fig. 5, and have provided it with sections or divisions on each side of the bottom 31 and these divisions also may be equipped with clips 29. To enable the drawer to be used conveniently on both sides, I have provided a locking member 32 which may be formed by a spring secured to the cross piece 26 and fashioned to provide one or more drawer engaging sections 33, which may conveniently enter the depressions or slots 34 in the back and front edges, respectively, of the drawer, those in the front edge being formed by making a depression in the plate 18.

By this means the drawer may be locked in position with either side up, while in use, so that it may serve also to some extent as a rest for the purpose of writing or working thereon without danger of its turning on its pivots 22$^a$, 22$^a$. By withdrawing the spring 33 from engagement with the slots 34 by pressure of the fingers thereon, the drawer may be turned about its pivots 22$^a$, 22$^a$, to bring either side uppermost.

To enable the drawer or slide to be removed and placed in a vault or safe, if desired, I have provided the outer end of each slide 22 with a slot 35 in which the pivots 22$^a$, 22$^a$, normally rest permitting ready removal of the same therefrom, the slot being curved to avoid the danger of the drawer being accidentally knocked up and out of the slots 35, 35, by a blow from beneath.

In Fig. 6 I have shown a modified form of drawer or slide wherein each section 7 is provided with a plurality of leaves 36 of metal or other suitable material hinged to suitable rods or pivot members 37 by curling the lower edges of the leaves 36 thereabout. For holding these several leaves in normally closed position, I have provided a spring clip 38 similar to the clip 29 previously referred to, and secured to the bottom 31 of the drawer in the same manner, to hold the leaves one against the other and all in normally closed position, but permitting ready separation thereof for the purpose of inserting therebetween sheets of papers or other material as desired, see Fig. 7.

In the form of drawer illustrated in Figs. 6 and 7, in order that the leaves may open in the same direction whichever side of the drawer is uppermost, they are relatively oppositely positioned on opposite sides of the drawer, see Fig. 7. In order that the several leaves 36 may also lie as nearly parallel with the bottom of the drawer as possible, I have shown the bottom 31 offset at substantially the median line longitudinally of the drawer, thus positioning the rods 37 more nearly in the plane of the bottom of the drawer and accomplishing the desired result.

Obviously, various modifications of my invention as illustrated herein may be made, all within the scope of the appended claim, and within the spirit of the invention, without departing therefrom.

Claim:

As a new article of manufacture, a filing cabinet comprising side members, slide supporting guides thereon, each guide having an offset section in the back thereof, a slide receiving channel in the guide, a groove in the back of the channel and within the offset section of the guide, a drawer supporting slide in each channel having an upset section thereof positioned in the groove, guide fastening members in the grooves positioned to be engaged by the upset slide section to stop the movement of the slides.

In testimony whereof I have signed my name to this specification in the presence of two subscribing witnesses.

JOHN P. RATIGAN.

Witnesses:
EVERETT S. EMERY,
ELIZABETH P. HILLIARD.